March 16, 1965   W. R. EDWARDS ETAL   3,173,968
PROCESS FOR SEPARATING OLEFINS
Filed Aug. 20, 1962
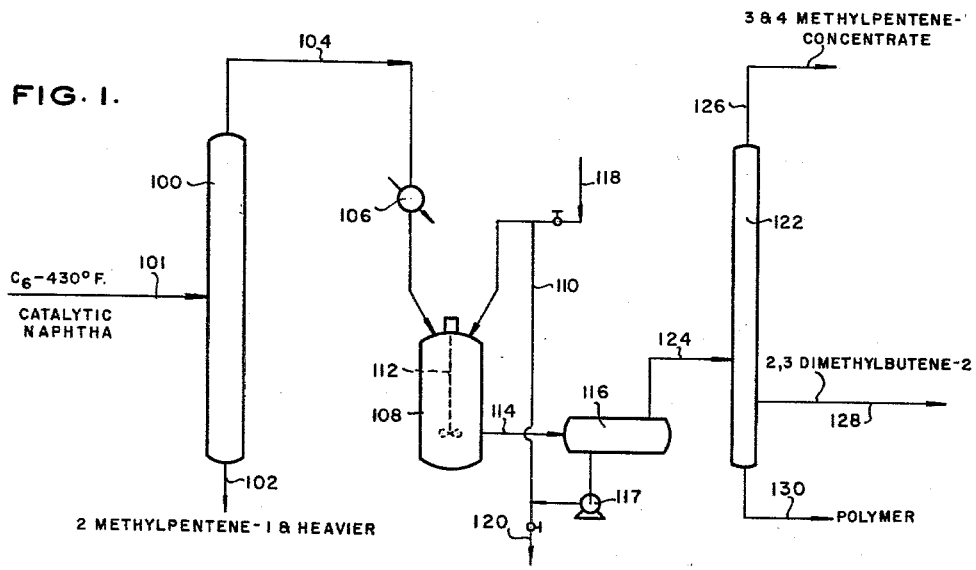
FIG. 1.
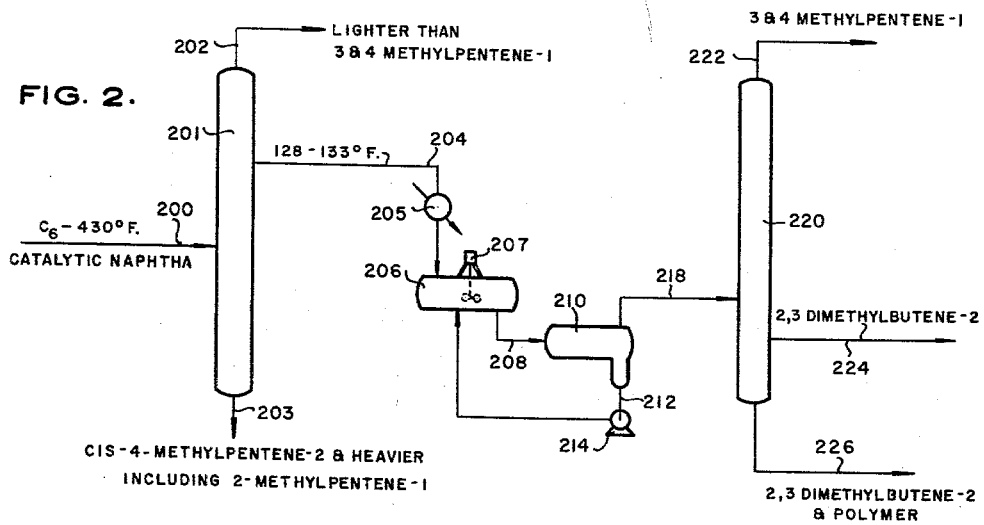
FIG. 2.
| 3 METHYLPENTENE-1 | 129.45°F. |
| 4  "       "     -1 | 128.98°F. |
| 2,3 DIMETHYLBUTENE-1 | 132.21°F. |
| 2,3  "       "     -2 | 163.78°F. |
FIG. 3.
INVENTORS.
WILLIAM R. EDWARDS,
ROBERT D. WESSELHOFT,
BERT B. WILLIAMS,
BY
ATTORNEY.

United States Patent Office 3,173,968
Patented Mar. 16, 1965

3,173,968
PROCESS FOR SEPARATING OLEFINS
William R. Edwards and Robert D. Wesselhoft, Baytown, Tex., and Bert B. Williams, Princeton, N.J., assignors, by mesne assignments, to Esso Research and Engineering Company, Elizabeth, N.J., a corporation of Delaware
Filed Aug. 20, 1962, Ser. No. 217,890
7 Claims. (Cl. 260—683.2)

The present invention is directed to a process of separating 3-methylpentene-1 and 4-methylpentene-1 from 2,3-dimethylbutene-1. More particularly, the present invention is directed to the selective isomerization of 2,3-dimethylbutene-1 (boiling point 132.2° F.) into 2,3-dimethybutene-2 (boiling point 163.8° F.) whereby 3- and 4-methylpentene-1 can be fractionally distilled therefrom as a substantially pure product. In its most specific aspect, the present invention relates to the preparation of either a product of 2,3-dimethylbutene-2 or a product admixture of high purity 3- and 4-methylpentene-1 (or both) by first fractionating a hydrocarbon stream containing these compounds to provide a narrow boiling feed stock, selectively isomerizing the narrow boiling feed stock with sulfuric acid having a concentration within a critical range at a temperature within a critical range, and fractionating the isomerization product to produce the desired streams.

Any hydrocarbon mixture containing 3-methylpentene-1, 4-methylpentene-1, and 2,3-dimethylbutene-1 is a suitable feed stock for the present invention. For example, in catalytic naphtha which boils within the range of $C_6$ (about 120° F.) through 430° F., it has been found that substantial amounts of 3- and 4-methylpentene-1 and 2,3-dimethylbutene-1 are present. In these stream, the 2,3-dimethylbutene-1 boils at 132.2° F., within 3° F. of 4-methylpentene-1 (129° F.), and within 2.5° F. of 3-methylpentene-1 (129.5° F.). Thus, separation by fractionation is virtually impossible, and, at the least, prohibitively expensive. Further, separation of the stream by selective extraction of 2,3-dimethylbutene-1 by using sulfuric acid is much more complicated and expensive than the novel separation method of the present invention.

In making the separation of products as above outlined, several problems present themselves. Firstly, the 3- and 4-methylpentene-1 tend to isomerize to c-3-methylpentene-2 (153.7° F.) and t-3-methylpentene-2 (158.8° F.) which boil at temperatures near that of 2,3-dimethylbutene-2 (163.8° F.). See Table I, below.

TABLE I
Compound: Boiling Point, ° F.
4-methylpentene-1 _____ 129.0
3-methylpentene-1 _____ 129.5
2,3-dimethylbutene-1 _____ 132.2
c-3-methylpentene-2 _____ 153.7
t-3-methylpentene-2 _____ 158.8
2,3-dimethylbutene-2 _____ 163.8

Thus, isomerization of the 3- and 4-methylpentene-1 has deleterious effects on the purity of the 2,3-dimethylbutene-2. Further, at higher acid strengths, the 3- and 4-methylpentene-1 tend to polymerize either with themselves or with 2,3-dimethylbutene-2, or both, to form a net loss of product which is an economic loss. Also, in the double bond isomerization process, the same catalysts which tend to promote double bond shifts tend also to promote skeletal isomerization, with concomitant product loss. Thus, the 3- and 4-methylpentene-1 are susceptible to skeletal isomerization to many hexene isomers, including straight chain olefinic hydrocarbons.

The present invention involves the selective isomerization of 2,3-dimethylbutene-1 into 2,3-dimethylbutene-2 in an environment such that the 2,3-dimethylbutene-2 can be fractionally separated from 3- and 4-methylpentene-1. Selective prefractionation is utilized to remove compounds such as 2-methylpentene-1, which would isomerize into compounds which would interfere with the final separation by fractionation of products into the desired high purity product stream. Further, the acid concentration is maintained below 75% and the temperature below 100° F. to avoid isomerizing 4-methylpentene-1 and 3-methylpentene-1 into undesirable isomers such as 2-methylpentene-2 and 3-methylpentene-2.

The mode of practicing the present invention can be seen by reference to the appended drawing wherein:
FIG. 1 is a schematic flow sheet representing a preferred mode of obtaining a high purity of 2,3-dimethylbutene-2 product stream, while taking off 3- and 4-methylpentene-1 as a concentrate;
FIG. 2 represents a preferred mode for obtaining both 2,3-dimethylbutene-2 and a high purity 3- and 4-methylpentene-1 product stream; and
FIG. 3 is a comparison of the boiling points of the methylpentenes and methylbutenes involved in the process.

Referring first to FIG. 1, wherein is shown a preferred mode for obtaining 2,3-dimethylbutene-2 as a pure product, the depentanized catalytic naphtha feed stock is introduced into the fractionating tower 100 by means of line 101, and is fractionated to provide a bottoms stream 102 comprising 2-methylpentene-1 and heavier hydrocarbons, and an overhead stream which comprises the rest of the catalytic naphtha feed stock. The overhead stream is removed by way of line 104 and is passed through cooler 106, and is charged into the isomerizing contactor 108.

In the isomerizing contactor 108, the overhead stream is contacted with sulfuric acid which is introduced by way of line 110, and is agitated by means 112. A bottoms stream is withdrawn by way of line 114 and is settled in settler 116. The isomerization reaction is carried out at 30° F. to 50° F., preferably in contact with sulfuric acid of 70 to 75% concentration and in an acid-to-hydrocarbon ratio from about 1:10 to about 10:1. The acid is separated from the hydrocarbon phase in the settler 116 and is returned by way of line 110 into the contacting zone. It is not necessary to regenerate the acid which is used as an isomerizing catalyst, and hence it is recycled continuously. Fresh acid may be added into the system by way of line 118, and a purge stream of spent acid may be withdrawn periodically or continuously by way of line 120.

The hydrocarbon separated from the acid in drum 116 is passed into the fractionator 122 by way of line 124. In the fractionator 122, 3- and 4-methylpentene-1 is taken off as a concentrate overhead, while high purity 2,3-dimethylbutene-2 is recovered by way of line 128 as a side stream. A bottoms stream 130 is withdrawn, which comprises polymer formed during the foregoing operation.

The 3- and 4-methylpentene-1 concentrate withdrawn by way of line 126 may contain various amounts of impure materials, since the original separation in fractionator 100 does not remove compounds lighter than 4-methylpentene-1 or all of the compounds heavier than 3-methylpentene-1. Therefore, these compounds will pass through the system and will be removed overhead with the 3- and 4-methylpentene-1. Further fractionation, of course, can separate the 3- and 4-methylpentenes from these other compounds.

Thus, it is seen, by the preferred mode of FIG. 1, that the 2,3-dimethylbutene-1 is selectively isomerized in a catalytic naphtha cut which is chosen to allow recovery of a substantially pure 2,3-dimethylbutene-2 product. By using the selective fractional separation as set forth in the mode of FIG. 1, hydrocarbons which interfere with the recovery of 2,3-dimethylbutene-2 as a pure product stream are removed in the prefractionator 100.

In FIG. 2 is shown a preferred mode wherein 3- and 4-methylpentene-1 are recovered as a substantially pure stream, with the lighter materials being separated from the feed stock before the isomerization step. 2,3-dimethylbutene-2 may also be recovered as a substantially pure product, but in lower yields than in the preferred mode as shown in FIG. 1, since some 2,3-dimethylbutene-1 will be lost in the prefractionator bottoms stream.

Adverting to FIG. 2, the catalytic naphtha feed stock is introduced by way of line 200 into a prefractionator 201, and is separated into an overhead fraction 202 comprising materials lighter than 3- and 4-methylpentene-1, that is having a boiling point of less than 128° F. A bottoms fraction is withdrawn by way of line 203, comprising cis-4-methylpentene-2 and heavier materials including 2-methylpentene-1. The heart cut boiling within the range of about 128° F. to 133° F. is withdrawn by way of line 204 and passed through a cooler 205, and is then passed into isomerizing vessel 206 equipped with stirring means 207. The isomerization reaction is accomplished under conditions similar to those set forth in the discussion of FIG. 1. The admixture of acid and hydrocarbon is passed from the reactor 206 by way of line 208 into a settler 210, from whence the lower acid layer is passed by way of line 212 and pump 214 back into the reaction zone 206. The hydrocarbon layer from settler 210 is passed by way of line 218 into fractionator 220, where the hydrocarbon is separated into a substantially pure overhead stream of 3- and 4-methylpentene-1 by way of line 222, and into a high purity side stream 224 of 2,3-dimethylbutene-2. The bottoms stream 226 comprises polymer formed during the isomerization reaction and some 2,3-dimethylbutene-2.

Thus, it is apparent that by the mode set forth in FIG. 2, a high purity 3- and 4-methylpentene-1 product may be obtained. This high purity product may suitably be used as a feed stock in polymerization reactions providing a high molecular weight polymer.

As is apparent from the foregoing discussion, the separation of 3-methylpentene-1 and 4-methylpentene-1 from 2,3-dimethylbutene-1 and other close boiling compounds is accomplished by fractionation alone only with difficulty in view of the extremely close boiling ranges of the various hydrocarbons. This involves superfractionation which is extremely costly in terms both of plant investment and operating costs. Also, in order to obtain fractionally one of the compounds as a pure product, certain amounts of that compound must be taken off with other streams, involving a net loss on product. Since the materials to be produced by the practice of the present invention are intended for use as chemical feed stocks of high purity, the necessity of precise separation involving a minimized amount of contaminants is apparent.

In order to illustrate the problems that are involved in the separation of the materials here involved, following in Table II is set forth the composition of a typical depentanized light catalytic naphtha stream, including the boiling points of the various components.

TABLE II

*Composition of depentanized light catalytic naphtha*

| Compound | Boiling Point, ° F. | Volume Percent |
| --- | --- | --- |
| 4-methylpentene-1 | 129 | 0.38 |
| 3-methylpentene-1 | 129.5 | 0.47 |
| 2,3-dimethylbutene-1 | 132 | 0.63 |
| cis-4-methylpentene-2 | 133 | 0.33 |
| 2,3-dimethylbutane | 136 | 0.27 |
| Trans-4-methylpentene-2 | 137 | 0.81 |
| 2-methylpentane | 140 | 3.00 |
| 2-methylpentene-1 | 141 | 2.33 |
| 3-methylpentane | 146 | 1.72 |
| 1-hexene | 146 | 0.27 |
| 2-ethylbutene-1 | 148 | 0.79 |
| Heavier compounds | 149–430 | 89.00 |
| | | 100.0 |

The materials boiling within the range of about 129° F. to about 148° F. constitute the compounds boiling closest to the 3- and 4-methylpentene-1 and 2,3-dimethylbutene-1, which are involved in the present invention. Other materials than the listed compounds are included in trace to minor amounts in the $C_6$ to 430° F. catalytic naphtha stream, but do not affect the practice of the invention. A depentanizing fractionation step is suitably used to prepare the light catalytic naphtha for submission to the prefractionator of the present invention, lower boiling materials being withdrawn before submission to the prefractionator. The higher boiling compounds will be removed in the prefractionator of the present invention.

As is seen by advertence to Table II, 3- and 4-methylpentene-1, 2,3-dimethylbutene-1, and cis-4-methylpentene-2 boil within a very narrow range. The cis-4-methylpentene-2 is present, however, in lesser quantities than the 2,3-dimethylbutene-1. Where 3- and 4-methylpentene-1 are to be recovered as a pure product, a precise fractionating step can be utilized in the prefractionator to remove the bulk of the cis-4-methylpentene-2, along with some of the 2,3-dimethylbutene-1. The "heart cut" preferably boils from 122° F. to 136° F., specifically 128° F. to 133° F. being most desirable. Where 2,3-dimethylbutene-2 is the desired product, the precise fractionation is not necessary with regards to cis-4-methylpentene-2 since the isomerization of 2,3-dimethylbutene-1 into 2,3-dimethylbutene-2 (boiling at about 164° F.) allows separation of the cis-4-methylpentene-2 and the 3- and 4-methylpentene-1 therefrom as substantially lower-boiling compounds.

The prefractionating step accomplishes two objects. First, it removes compounds in the feed stock which themselves boil within the range of the isomerized product, 2,3-dimethylbutene-2 (163.8° F.), and, secondly, removes compounds which would be isomerized to compounds which would boil within the same range as 2,3-dimethylbutene-2. For instance, 2-methylpentene-1 can be isomerized into 2-methylpentene-2 which boils at 153° F., which is about 11° below the boiling point of 2,3-dimethylbutene-2. This would require more precise fractionation in the product clean-up than otherwise would be required.

Thus, it is apparent that the type of prefractionation step which is to be utilized will be dependent upon several factors. First, it will be determined by the product to be obtained, whether 3-methylpentene-1 and 4-methylpentene-1 are desired as a substantially pure product or whether it is desired to recover 2,3-dimethylbutene-2 as the product stream. Secondly, the degree of separation and prefractionation is determined by the choice of the point in the operation where the separation in high purity is to be made. A separation in high purity in the prefractionator is the preferred mode, thus preventing the carrying through of undesired materials into the isomerizing step and the subsequent product clean-up fractionation. However, it is possible to operate with a less precise prefractionation separation and to operate the product fractionation step under more precise conditions in order to obtain the desired product.

It should be stressed, however, that the essence of the invention resides in the use of the critical isomerizing step intermediate the fractionation steps to change the boiling point of 2,3-dimethylbutene-1 in order to allow removal of that material from the remainder of its close boiling isomers, without isomerization or reaction of these other materials. By the practice of the present invention, the separation and recovery of products in high purity are accomplished in a surprisingly efficient manner.

As has been above set forth, the isomerization step must be accomplished within certain critical ranges of temperature and acid concentration in order to selectively isomerize the 2,3-dimethylbutene-1 while leaving the remainder of the compounds in the stream substantially unaffected. The time, however, is not critical and can vary widely, depending on temperature and acid concentration. A suitable range is from 5 minutes to 4 hours. The isomerizing step must be accomplished with sulfuric acid, having a concentration within the range of 65 to 75 weight percent, and at a temperature within the range from about 20° F. to about 100° F. At acid strengths below 65%, corrosion of the vessels increases, whereas, at strengths above about 75%, polymerization rates become too high for commercially feasible operation. Further, at higher acid concentrations, undesirable isomerization of 3-methylpentene-1 and 4-methylpentene-1 will occur. The preferred acid concentration is about 70%, and the preferred temperature range is from about 30° F. to about 50° F. At higher acid concentrations, a lower temperature should be employed; whereas, at the lower acid concentration, higher temperatures in general may be employed. However, in the upper range of operable temperature limits, some polymerization and deleterious isomerization occur which constitute a net loss on product. This may be offset by lessening the residence time within the isomerizing zone, resulting in a diminution of the undesirable reactions while suffering, however, a lower conversion of 2,3-dimethylbutene-1 into 2,3-dimethylbutene-2.

In order to establish the criticality of acid concentration, the following examples are set forth.

EXAMPLE 1

A narrow boiling charge stock was prepared by distilling a light catalytic naphtha. The charge stock was contacted at 32° F. with an equal volume of 70% by weight sulfuric acid and admixed for 2 hours in a reaction vessel fitted with a stirrer. The hydrocarbon was then separated from the acid, and was found to have the composition set forth in Table III in comparison with the charge stock.

TABLE III

| Component | Feed, Wt. Percent | Product, Wt. Percent |
|---|---|---|
| 3- and 4-methylpentene-1 | 74.4 | 79.8 |
| Cis-4-methylpentene-2 | 1.9 | 1.5 |
| 2,3-dimethylbutene-1 | 11.6 | 0.4 |
| Cyclopentane | 9.1 | 9.2 |
| Cyclopentene | 3.0 | 1.5 |
| 2,3-dimethylbutene-2 | 0.0 | 7.6 |
| Total | 100.0 | 100.0 |

It is seen that 2,3-dimethylbutene-2 was produced without isomerizing 3- and 4-methylpentane-1 to deleterious products. It was found that the selectivity of 2,3-dimethylbutene-1 into 2,3-dimethylbutene-2 was 95%.

EXAMPLE 2

A similar run was made utilizing 70% sulfuric acid at 80° F. with a contact time of 2½ hours. A comparison of the prefractionated catalytic naphtha feed stream with the product obtained after one-half hour and 2½ hours contact times is set forth below:

TABLE IV

| Composition of Hexenes, Wt. Percent | Feed | 0.5 Hr. | 2.5 Hr. |
|---|---|---|---|
| 3- and 4-methylpentene-1 | 71.7 | 69.1 | 53.2 |
| Cis-4-methylpentene-2 | 2.7 | 3.4 | 0.8 |
| 2,3-dimethylbutene-1 | 15.0 | 1.0 | 1.0 |
| Trans-4-methylpentene-2 | 0.0 | 1.2 | 2.4 |
| Paraffins | 10.6 | 10.1 | 15.9 |
| 2-methylpentene-2 | 0.0 | 0.7 | 3.2 |
| Cis-3-methylpentene-2 | 0.0 | 0.9 | 4.0 |
| Trans-3-methylpentene-2 | 0.0 | 2.1 | 8.3 |
| 2,3-dimethylbutene-2 | 0.0 | 11.5 | 11.2 |

From Table IV it is seen that at the higher temperature of 80° F. the selectivity of the isomerization decreases, the concentration of 3- and 4-methyl-pentene-1 decreasing with contact time while the total 3- and 4-methylpentene-2 concentration increases. This indicates that the 3- and 4-methylpentene-1 are being isomerized, a deleterious effect attributable to the higher temperature.

EXAMPLE 3

In order to establish the operability of the process at lower acid strengths, a prefractionated catalytic naphtha feed stock was contacted with 65 weight percent sulfuric acid at 80° F. for 2 hours with good results. Following is a comparison of the feed stock with the product.

TABLE V

| Component | Feed, Wt. Percent | Product, Wt. Percent |
|---|---|---|
| 3- and 4-methylpentene-1 | 47.2 | 47.2 |
| Cis-4-methylpentene-2 | 11.8 | 11.8 |
| 2,3-dimethylbutene-1 | 34.3 | 3.6 |
| Paraffins | 6.7 | 5.8 |
| 2-methylpentene-2 | | 0.4 |
| Cis-3-methylpentene-2 | | 0.2 |
| Trans-3-methylpentene-2 | | 0.6 |
| 2,3-dimethylbutene-2 | | 30.4 |

Thus, it is apparent that the 2,3-dimethylbutene-1 was converted to 2,3-dimethylbutene-2 in a selectivity of about 90%, while leaving the other components substantially unaffected. The use of a lower acid strength allowed operation at the elevated temperature without deleterious effect.

EXAMPLE 4

A prefractionated catalytic naphtha feed stock was contacted in the same manner as in Example 1, utilizing a concentration of acid of about 75 weight percent at a temperature of about 32° F. Following is a comparison of the components in the feed and in the product after one hour of isomerization.

TABLE VI

| Component | Feed, Wt. Percent | Product, Wt. Percent |
|---|---|---|
| 3- and 4-methylpentene-1 | 51.4 | 57.7 |
| Cis-4-methylpentene-2 | 38.7 | 37.7 |
| 2,3-dimethylbutene-1 | 8.7 | 0.1 |
| 2,3-dimethylbutane | 1.2 | 1.3 |
| 2-methylpentene-2 | | 0.1 |
| Cis-3-methylpentene-2 | | 0.1 |
| Trans-3-methylpentene-2 | | 0.2 |
| 2,3-dimethylbutene-2 | | 2.8 |

A small amount of 3- and 4-methylpentene-1 and cis-4-methylpentene-2 was converted during the isomerizing step using the higher concentration acids.

EXAMPLE 5

In order to illustrate the effect of using 80% sulfuric acid at various temperatures, a prefractionated catalytic naphtha feed stock was contacted for one-half hour at 32° F. with an 80% by weight sulfuric acid. The results are shown below in a table comparing the feed and the product.

TABLE VII

| Component | Feed, Wt. Percent | Product, Wt. Percent |
|---|---|---|
| 3- and 4-methylpentene-1 | 51.4 | 3.0 |
| Cis-2-methylpentene-2 | 38.7 | 0.4 |
| Trans-4-methylpentene-2 | | 1.1 |
| 2,3-dimethylbutene-1 | 8.7 | 0.0 |
| 2,3-dimethylbutane | 1.2 | 1.2 |
| 2-methylpentene-2 | | 0.2 |
| Cis-3-methylpentene-2 | | 0.3 |
| Trans-3-methylpentene-2 | | 1.0 |
| 2,3-dimethylbutene-2 | | 0.3 |
| Polymer | | 92.5 |

Note that the 3- and 4-methylpentene-1 were converted almost entirely into polymeric materials. In addition to the polymer shown above, an equal amount of the olefins was converted to 2-methylpentenes and 3-methylpentenes which remained in the acid.

EXAMPLE 6

A prefractionated catalytic naphtha feed stock was contacted with 80% acid for 1½ hours at 80° F. in order to illustrate the effect of high temperatures and high acid concentrations. The following is a comparison of the components in the feed and in the product.

TABLE VIII

| Component | Feed, Wt. Percent | Product, Wt. Percent |
|---|---|---|
| 3- and 4-methylpentene-1 | 64.3 | 5.1 |
| 2,3-dimethylbutene-1 | 5.1 | 0.0 |
| Paraffins | 30.6 | 30.6 |
| Polymer | | 64.3 |

At high acid strength and high temperatures, virtually all of the 3- and 4-methylpentene-1 and 2,3-dimethylbutene-1 were converted to polymer, a net loss of product. No 2,3-dimethylbutene-1 was recovered.

From the above examples it is apparent that the selective isomerization of 2,3-dimethylbutene-1 into 2,3-dimethylbutene-2 in a manner allowing separation of the desired product from the reaction products is dependent upon the acid strength and the temperature. At an acid strength within the range of about 65 to 75 weight percent, temperatures can be used within the range from about 20° F., where operating expenses become unnecessarily large, and about 100° F., where the amount of polymer formation and isomerization of 3- and 4-methylpentene-1 occur in deleteriously large amounts. Further, at the higher temperature levels it is shown that polymer formation and conversion of 3- and 4-methylpentene-1 may be controlled, when using weaker acid, by shortening the contact times in the isomerizing zone. Shorter contact times may also be used with acid of higher concentration (e.g., 75%) at lower temperatures.

Applicants have shown the invention in two preferred modes, and have submitted several examples to establish the criticality of the various variables of the process. The scope of the invention, however, should not be limited by the specific examples and preferred modes above set forth, but only by the scope of the appended claims.

We claim:
1. A method which comprises fractionating a hydrocarbon stream containing 3-methylpentene-1, 4-methylpentene-1, methyl cyclopentane and 2,3-dimethylbutene-1 to obtain a hydrocarbon mixture boiling within the range of about 122° F. to about 136° F., contacting said hydrocarbon mixture with sulfuric acid having a concentration by weight within the range from about 65% to about 75%, at a temperature within the range from about 20° F. to about 100° F., and for a time within the range from about 5 minutes to about 4 hours, whereby said 2,3-dimethylbutene-1 is isomerized selectively into 2,3-dimethylbutene-2, separating said contacted hydrocarbon mixture from said acid, and fractionating said contacted hydrocarbon mixture to recover an admixture of 3-methylpentene-1 and 4-methylpentene-1 as a first product stream, and 2,3-dimethylbutene-2 as a second product stream.

2. A method in accordance with claim 1 wherein the hydrocarbon-to-acid ratio in the isomerization step is within the range from about 1:10 to about 10:1.

3. A method in accordance with claim 1 wherein the boiling range of the hydrocarbon mixture is from 128° F. to 133° F.

4. A method which comprises fractionating a light depentanized catalytic naphtha stream to obtain a hydrocarbon mixture having a boiling range of 122° F. to 136° F. contacting said hydrocarbon mixture with sulfuric acid having a concentration by weight within the range from about 65% to about 75%, at a temperature within the range from about 20° F. to about 100° F., and for a time within the range from about 5 minutes to about 4 hours, whereby 2,3-dimethylbutene-1 is selectively isomerized into 2,3-dimethylbutene-2, separating said contacted hydrocarbon mixture and said acid, and fractionating said contacted hydrocarbon mixture to obtain 2,3-dimethylbutene-2 as a substantially pure product.

5. A method in accordance with claim 4 wherein the hydrocarbon-to-acid ratio in the isomerization step is maintained within the range from about 1:10 to about 10:1.

6. A method in accordance with claim 4 wherein the acid concentration is about 70% by weight and the temperature is within the range from about 30° F. to about 50° F.

7. A method in accordance with claim 4 wherein the boiling range of the hydrocarbon mixture is from 128° F. to 133° F.

References Cited in the file of this patent

UNITED STATES PATENTS 2,463,873    Heinrich _____ Mar. 8, 1949

OTHER REFERENCES

Kirrman et al.: Bull. Soc. Chim. (1945), 12, pages 809–814.